July 27, 1926.
W. J. TERRY
DUPLEX SHEATH FOR DENTAL HANDPIECES
Filed July 2, 1924
1,593,733
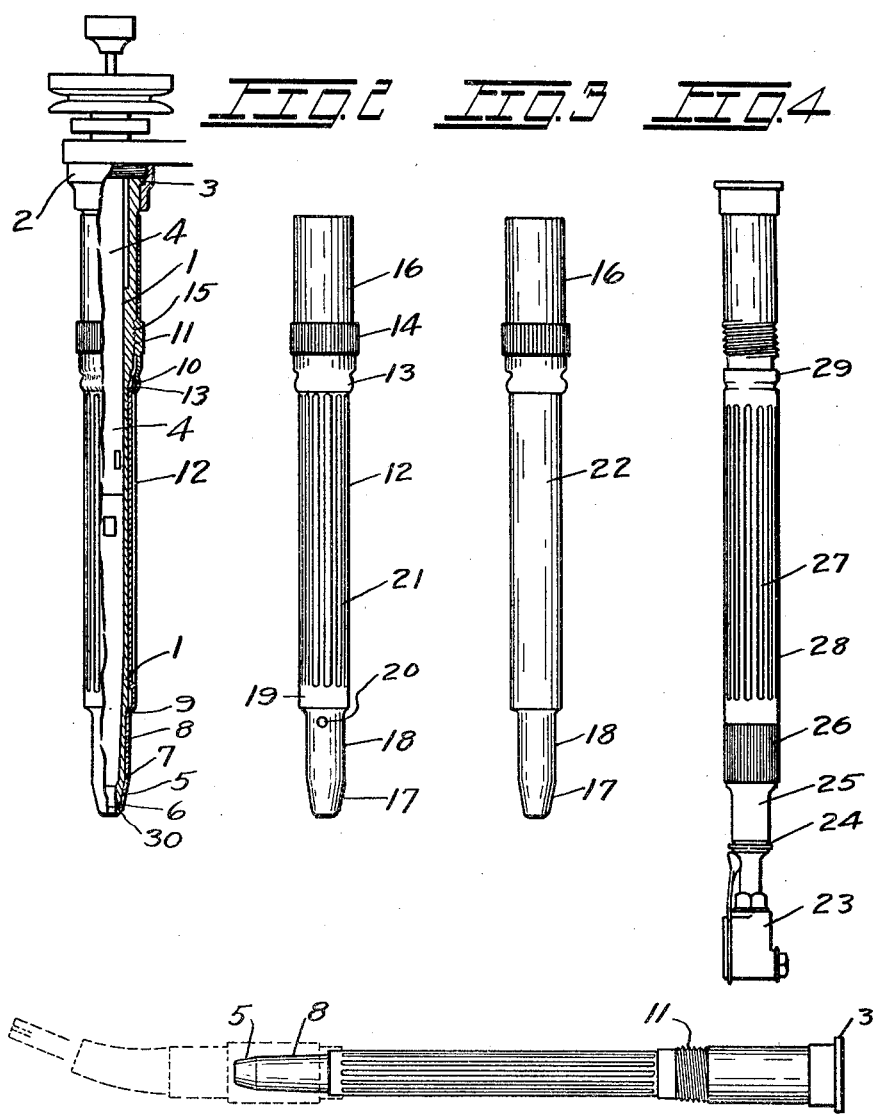
INVENTOR
Walter J. Terry
Harry Bowen
ATTORNEY Patented July 27, 1926.

1,593,733

UNITED STATES PATENT OFFICE.

WALTER J. TERRY, OF SEATTLE, WASHINGTON.

DUPLEX SHEATH FOR DENTAL HANDPIECES.

Application filed July 2, 1924. Serial No. 723,696.

The invention is a sheath for dental handpieces which is made with a removable sleeve or cover.

The object of the invention is to provide a means for cleaning the sheath of handpieces which will make it possible to sterilize it in the same sterilizing solution that other parts or instruments are being sterilized in without polluting the solution with grease.

Another object of the invention is to provide a removable cover for the sheath of dental handpieces which is practically of the same design as the sheath.

And a further object of the invention is to provide a thin removable cover for dental handpiece sheathes which is grooved to correspond with other grooves in the sheath so that it will rotate with it.

And a still further object of the invention is to provide a means for making dental handpieces sanitary, which will stop the flow of bacteria into the interior.

With these ends in view the invention embodies the providing of a sheath with a thin removable cover, said cover being readily attached to or removed from the sheath and having its lower end tapered similar to that of the sheath so that an angular or other attachment may readily be attached to either the cover or sheath.

Other features and advantages of the invention will be seen from the following description taken in connection with the drawings, wherein:—

Figure 1 is a view of the cover showing part broken away to show the sheath.

Figure 2 is a side view of the cover.

Figure 3 is a side view of the cover showing an alternate design.

Figure 4 is a side view showing a special cover which may be used for holding the right angle attachment.

Figure 5 is a side view showing an angular attachment in dotted lines on the end of the sheath.

In the drawings I have shown my device as it would be constructed wherein numeral 1 indicates the sheath which may be held to the head of the device as shown or to any straight handpiece by a nut 2 which will engage a collar 3 at its upper end and which may be made to hold a spindle which I have indicated by the numeral 4. The lower end of the sheath 1 is provided with a beveled surface 5 which extends from the point 6 to the point 7 and then a section 8 with a slight taper which extends from the point 7 to the point 9 shown in Figure 1. From the point 9 to the point 10 the sheath is grooved and above the point 10 are threads 11 which hold the outer sleeve or cover 12. The cover 12, which is shown in Figure 2, is provided with a swivel joint at the point 13 and a knurled section 14 in the inner side of which are threads 15 that screw on the threaded section 11 and above this knurled section 14 is a thin sleeve 16 which engages the upper part of the sheath. The lower section of the cover 12 is also provided with a tapering section 17 to correspond with the section 5 of the sheath, and above this beveled surface is another tapering section 18 which corresponds with the tapered section 8 of the sheath. Above the section 18 is a straight section 19.

A pin 20 upon which the angular or other attachments may be held projects from the side of the section 18. Between the section 19 and the swivel joint 13 are grooves 21 which correspond with the grooves in the sheath and these grooves are of such a size that their inwardly projecting portions will extend into the grooves in the sheath and thereby cause the cover and sheath to rotate or be held together. It will be seen that as the upper end of the cover 12 is screwed onto the sheath the tapering sections at the lower end will bind against similar sections at the lower end of the sheath.

In Figure 3 I have shown an alternate design in which the entire cover which I have indicated by the numeral 22 is made in one piece without the swived joint. The grooves are omitted so that the cover may be screwed upon the threads 11 and it will be seen that the tapering sections 17 and 18 will rigidly hold the cover to the sheath.

In Figure 4 I have shown another alternate design in which a right angle attachment 23 is attached to the lower end of the cover at the point 24. In this design the tapering section 17 is on the inside of the sleeve 25 and the section 26 above this section is knurled to provide a gripping surface. Above this section is a grooved section 27 in which the grooves are similar to the grooves 21 in the cover 12 so that they may be placed over grooves on the sheath. The upper end of the cover shown in Figure 4 which I have indicated by the numeral 28 is provided with a short sleeve 29 which fits snugly over the straight section below the threads 11 on the sheath and it will be seen that this section and the tapering section in the sleeve 25 will hold the device upon the sheath. However, it is understood that the upper end of the sleeve 28 may be provided with a section 16 similar to that shown in Figure 2, in which this section is connected to the lower part of the sleeve by a swivel joint, or as shown in Figure 3, in which this section is attached to the sleeve with the grooves omitted.

In Figure 5 I have shown an external view of the sheath showing an angular attachment in dotted lines as it would appear when placed over the end of the sheath. It is understood that this angular attachment may either be placed over the end of the sheath or cover as may be desired.

It will be understood that changes may be made in the construction without departing from the spirit of the invention. One of which changes may be in the design of the sheath or cover; another may be in the means for holding the sheath to the cover; and still another may be in the providing of similar attachments, similar to the device shown in Figure 4, for holding other attachments to the cover.

The construction will readily be understood from the foregoing description. To use the device it will be seen that the handpiece may be used with or without the cover, however, when the cover is used it may readily be attached by placing it over the sheath and screwing the section 16 upon the threads 11. It will also be observed that several of these covers or sleeves may be used with one handpiece as one may be used while the other is being cleaned. To clean the cover it may readily be removed by unscrewing the sleeve 16. It will also be observed that a burr or other tool may be inserted through the end of the sleeve or cover and also through the sheath into the end of the spindle, and as the angular or other attachment are also provided with a shank similar to the shank of the burr, they may be held over the cover in a similar manner. It will be seen that a felt washer or packing 30 may be placed between the lower end or tip of the sheath and the shoulder on the inner side of the tip of the cover 12 is to stop the flow of saliva into the inside of the instrument.

Having thus fully described the invention, what I claim as new and desire to secure by Letters Patent, is:—

1. A sheath for dental handpieces having a removable cover, said sheath having grooves in its outer surface to correspond with similar grooves in the cover and threads upon which the cover may be screwed.

2. A cover for dental handpiece sheaths having threads by which it is screwed on the sheath, and grooves corresponding with grooves on the sheath to prevent its turning on the sheath, said cover providing means at the tip whereby a washer may be inserted to prevent the flow of saliva into the instrument.

3. A cover for dental handpiece sheaths having threads by which it is screwed on the sheath, and grooves corresponding with grooves on the sheath for preventing its turning on the sheath, said cover having a space between its end and the end of the sheath in which a washer may be inserted.

WALTER J. TERRY.